United States Patent [19]

Zyduck

[11] 4,037,878
[45] July 26, 1977

[54] VEHICLE WITH DUAL BRAKING SYSTEMS
[75] Inventor: Ronald L. Zyduck, Mosinee, Wis.
[73] Assignee: J. I. Case Company, Racine, Wis.
[21] Appl. No.: 690,888
[22] Filed: May 28, 1976
[51] Int. Cl.² ............................................. B60T 7/12
[52] U.S. Cl. ..................................... 303/13; 188/170
[58] Field of Search ........... 188/170; 212/39 B, 39 R, 212/59 R; 303/10, 13

[56] References Cited

U.S. PATENT DOCUMENTS

| | | | |
|---|---|---|---|
| 2,372,311 | 3/1945 | Brown | 188/170 X |
| 3,581,908 | 6/1971 | Pearson et al. | 188/170 X |
| 3,762,777 | 10/1973 | Jacob | 188/170 X |

Primary Examiner—Duane A. Reger
Attorney, Agent, or Firm—Dressler, Goldsmith, Clement, Gordon & Shore, Ltd.

[57] ABSTRACT

A crane having a turntable rotated about a fixed axis on a frame by drive means is disclosed herein. A manually actuated, fluid released brake is interposed between the frame and the turntable with a fluid circuit for supplying fluid under pressure designed so that the brake can readily be manually actuated or automatically actuated in response to actuation of the drive means.

6 Claims, 2 Drawing Figures

VEHICLE WITH DUAL BRAKING SYSTEMS

BACKGROUND OF THE INVENTION

The present invention relates generally to vehicles and more particularly to heavy duty construction equipment such as a vehicle that has a crane supported on a turntable that is rotated about an axis on the frame for the vehicle. In vehicles of this type, the equipment is designed so that the turntable is rotated by some drive means with respect to the frame of the vehicle that is supported on wheels. These vehicles normally have some type of brake means associated with the turntable to lock the turntable with respect to the frame when the crane is being operated.

In the past, there have been two types of systems which have been utilized as manufacturers installed equipment for such vehicles. At the time of manufacture, the vehicle or crane is equipped with either a free swinging or an automatic swinging brake system. The automatic brake system incorporates a spring applied brake which is released by the hydraulic fluid that is utilized for operating the hydraulic swing motor. In this system, the pressure rise on either side of the hydraulic swing motor is delivered to the brake cylinder to release the brake and, when the swing control valve is returned to neutral, hydraulic oil is bled from the brake cylinder to cause the spring to apply the brake.

In the free swinging system, the brake is again a spring applied brake which is released by hydraulic pressure that is controlled manually through the use of a control valve.

SUMMARY OF THE INVENTION

According to the present invention, a crane having a turntable rotated about a fixed axis on a frame is provided with two types of braking system so that the operator has a choice of which system he desires to use. The dual braking system is designed so that it can readily be incorporated into a crane with the addition of a minimum number of parts.

More specifically, the dual braking system is obtained by utilizing a fluid circuit that includes first and second parallel conduit means respectively leading from a pressurized fluid source to one end of a brake cylinder with the first conduit means having first valve means actuated in response to actuation of the drive motor for rotating the turntable on the fixed frame and a second manually operated valve means in the second conduit with a selector valve means in both conduits for selectively blocking flow in one conduit while accomodating flow in the other conduit so that the brake may be released either manually or in response to actuation of the drive motor.

DETAILED DESCRIPTION

Figure 1:
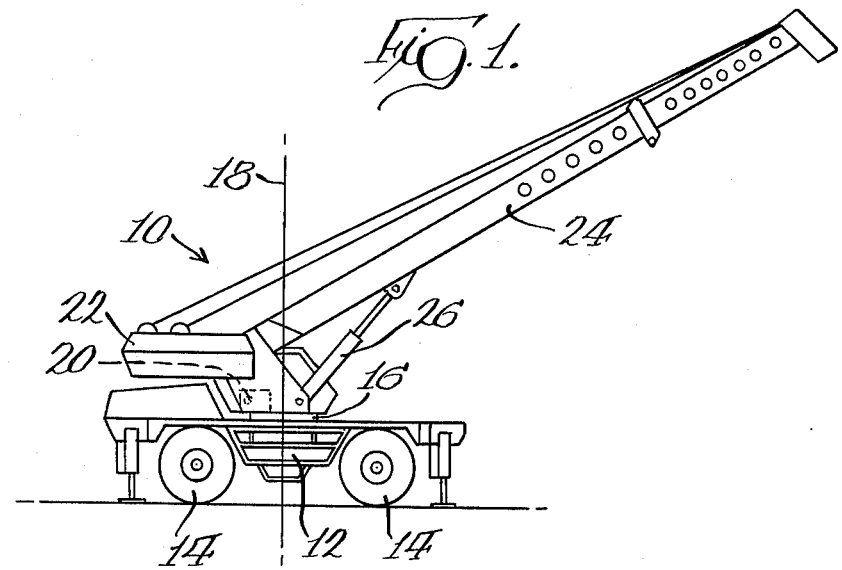
FIG. 1 shows a vehicle of the type that may have the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a vehicle, generally designated by the reference numeral 10, which is illustrated as a crane. Crane 10 has a frame 12 that is supported on a plurality of wheels 14. A turntable 16 is supported for rotation about a vertical axis 18 on frame 12 through a hydraulic motor 20 which has a gear box (not shown) secured thereto. Rotatable turntable 16 supports a housing 22 which encloses a power plant (not shown) and other suitable equipment required to operate the vehicle. A crane is supported on housing 22 and is raised and lowered through a fluid ram 26.

As indicated above, cranes of this type usually have some type of braking mechanism between frame 12 and turntable 16 to lock the turntable on the frame when the operator is working with the crane. According to the present invention, the braking system is designed to readily be operated in either of two modes of operation.

Figure 2:
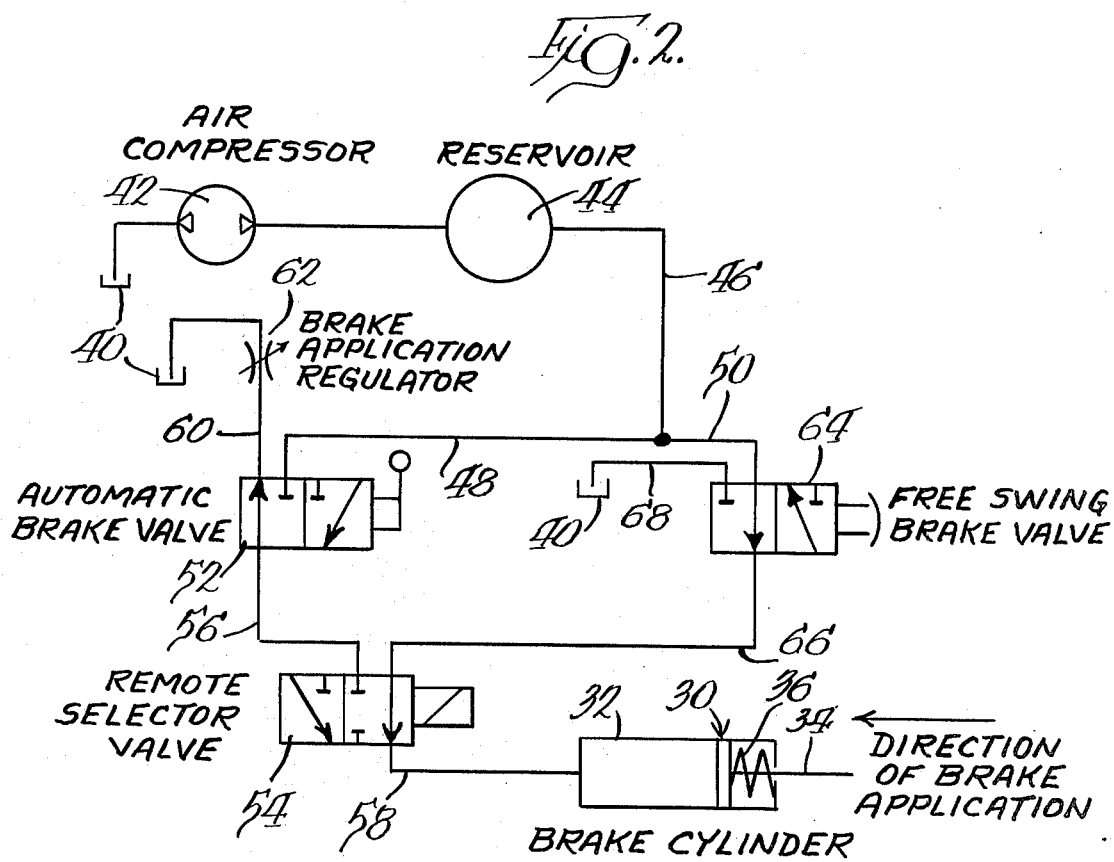
FIG. 2 is a schematic of the fluid circuit constructed in accordance with the present invention.

As illustrated in FIG. 2, the braking system includes a brake (not shown) that is actuated released by a fluid ram 30. Fluid ram 30 includes a cylinder 32 and a piston rod 34 reciprocated in cylinder 32 and spring biased to a first position by an internal spring 36. The piston rod 34 is connected to a multiple disc brake of the commercially known type that is now utilized in cranes of this type. The multiple disc brake preferably cooperates with the output shaft of hydraulic motor 20 so that the hydraulic motor shaft is fixed when the brake is applied. Preferably, the brake means is normally actuated by the force of spring 36 and is fluid released by supplying fluid to the head end of cylinder 32.

FIG. 2 shows the unique fluid circuit which allows the operator to choose which type of braking system is to be utilized for supplying fluid to cylinder 32. The fluid circuit includes a reservoir 40 for the fluid, which is preferably air but may likewise be a hydraulic fluid. A fluid source, such as an air compressor 42 is connected to accumulator 40 and supplies fluid under pressure to a pressurized reservoir 44. Reservoir 44 has an outlet conduit 46 connected thereto with two branch conduits 48 and 50 leading from conduit 46. Conduit 48 is connected to an inlet of a first valve 52 which has its outlet port connected to a selector valve 54 through a conduit 56. The outlet port of selector valve 54 is connected to the head end of cylinder 32 through a further conduit 58.

Valve 52 is also connected to reservoir 40 through a conduit 60. Conduit 60 has an adjustable restrictor 62 therein for a purpose that will be described later. Valve 52 is a two position valve having a first position in which reservoir or pressurized fluid source 44 is connected to conduit 56 and a second position (illustrated in the drawings) wherein conduit 56 is connected to reservoir 40 through restrictor means 62.

The fluid circuit also has a further valve 64 having its inlet port connected 50 and an outer port connected to selector valve 54 through a further conduit 66. Valve 64 is also connected to reservoir 40 through a conduit 68.

Valve 64 is preferably a manually actuated valve which has the capability of varying the pressure output in response to the position of the valve spool. Stated another way, manually actuated valve 64 is a variable pressure control valve that has the capability of metering fluid flow from source 44 to selector valve 54. One type of commercially available valve that can be utilized is a type TC2 valve sold by Bendix-Westinghouse.

Summarizing the fluid circuit so far described, conduits 46, 48, 56 and 58 define a first flow path or first conduit means which has control valve 52 therein. Control valve 52 is preferably moved from the position illustrated in response to actuation of the drive motor or drive means 20 and is returned to the position illustrated when the drive means is in a neutral condition. This may be accomplished by a cam that is connected to the linkage for the control valve that operates the hydraulic motor.

The fluid circuit also has a second flow path or second conduit means consisting of conduits 46, 50 and 66 with manually actuated valve 64 in the second conduit means. Selector valve 54 is a two position valve which connects conduit 56 to conduit 58 in one position and connects conduit 66 to conduit 58 in the second position. Thus, the respective conduits define two parallel flow paths from pressurized fluid source 44 to selector valve 54.

If the operator, therefore, wants manual control for the braking operation, he positions selector valve 54 to the position illustrated in the drawings wherein manually actuated valve 64 is connected to conduit 58 so that the operator has manual control of supplying pressurized fluid to brake cylinder 32 to release the brake.

Alternatively, if an operator wishes to utilize an automatic braking arrangement wherein the brake is released when the drive motor is actuated, it is only necessary to move selector valve 54 from the position illustrated to a second position wherein conduit 56 is connected to conduit 58. In this position, the rate at which fluid is forced from cylinder 32 is determined by the adjustment of restrictor valve 62 so that the operator can readily set the rate of brake release in this mode of operation.

As can be appreciated from the above description, the present invention provides the operator with a choice of braking systems for a vehicle. All of this is accomplished by utilizing a minimum number of valves, all of which are commercially available and can be incorporated into a vehicle at a minimum cost.

What is claimed is:

1. In a vehicle having a turntable rotated about a fixed axis on a frame by drive means with normally actuated fluid released brake means between said frame and said turntable, a fluid circuit for supplying fluid under pressure to said brake means comprising a reservoir, a pressurized fluid source connected to said reservoir, first conduit means connecting said source to said brake means, said first conduit means having first valve means actuated in response to actuation of said drive means, said first valve means having a first position connecting said source to said brake means and a second position connecting said brake means to said reservoir, restrictor means between said first valve means and reservoir restricting fluid flow from said brake means to said reservoir, second conduit means connecting said source to said brake means, said second conduit means having second manually actuated valve means therein, and selector valve means in said first and second conduit means for selectively blocking flow in one conduit means while accommodating flow in the other conduit means so that said brake means may be released either manually or in response to actuation of said drive means.

2. A vehicle as defined in claim 1, in which said selector valve means is located in said conduit means between said brake means and said first and second valve means.

3. A vehicle as defined in claim 1, in which said manually actuated valve means is capable of metering flow from said source to said brake means.

4. A vehicle as defined in claim 1, in which said fluid is air.

5. In a vehicle having a turntable rotated about a fixed axis on a frame by drive means with normally actuated fluid released brake means between said frame and said turntable, a fluid circuit for supplying fluid under pressure to said brake means comprising a reservoir, a pressurized fluid source connected to said reservoir, first conduit means connecting said source to said brake means, said first conduit means having first valve means actuated in response to acutation of said drive means, second conduit means connecting said source to said brake means, said second conduit means having second manually actuated valve means therein, said second manually actuated valve means having means for metering flow of fluid from said source to said brake means, and selector valve means in said first and second conduit means for selectively blocking flow in one conduit means while accommodating flow in the other conduit means so that said brake means may be released either manually or in response to actuation of said drive means.

6. In a vehicle having a turntable rotated about a fixed axis on a frame by drive means with normally actuated fluid released brake means between said frame and said turntable, a fluid circuit for supplying fluid under pressure to said brake means comprising a reservoir, a pressurized fluid sourc connected to said reservoir, first conduit means between said source and said brake means, said first conduit means having a two-position valve therein connecting said source to said brake means in a first position and connecting said brake means to said reservoir in a second position, second conduit means in parallel with said first conduit means connecting said source to said brake means, said second conduit means having a manually actuated valve therein for selectively controlling flow of fluid from said source to said brake means, and a selector valve in both of said first and second conduit means having a first position connecting said twoposition valve to said brake means and a second position connecting said manually actuated valve to said brake means.

* * * * *